United States Patent
Gallagher et al.

(10) Patent No.: US 9,053,518 B1
(45) Date of Patent: *Jun. 9, 2015

(54) CONSTRUCTING SOCIAL NETWORKS

(71) Applicant: Google Inc., Mountain View, CA (US)

(72) Inventors: James Alexander Gallagher, Sunnyvale, CA (US); David M. Cohen, Mountain View, CA (US); Chirag Shah, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/204,653

(22) Filed: Mar. 11, 2014

Related U.S. Application Data

(63) Continuation of application No. 13/434,699, filed on Mar. 29, 2012, now Pat. No. 8,700,710.

(51) Int. Cl.
   *G06F 15/16* (2006.01)
   *G06Q 50/00* (2012.01)
   *H04L 12/58* (2006.01)

(52) U.S. Cl.
   CPC .............. *G06Q 50/01* (2013.01); *H04L 12/588* (2013.01)

(58) Field of Classification Search
   CPC .............................. G06Q 50/01; H04L 12/588
   USPC ................. 709/202–205, 217–219, 227–229, 709/249–250
   See application file for complete search history.

(56) References Cited

U.S. PATENT DOCUMENTS

| | | | |
|---|---|---|---|
| 7,725,492 B2 | 5/2010 | Sittig et al. |
| 7,895,208 B2 | 2/2011 | Konopnicki |
| 7,904,511 B2 | 3/2011 | Ryan et al. |
| 7,996,045 B1 | 8/2011 | Bauer et al. |
| 8,060,627 B2 | 11/2011 | Rosenblatt et al. |
| 8,094,800 B1 | 1/2012 | Smith et al. |
| 8,135,343 B2 | 3/2012 | Kuroda et al. |
| 8,180,765 B2 | 5/2012 | Nicolov |
| 8,185,461 B2 | 5/2012 | Kenedy et al. |

(Continued)

FOREIGN PATENT DOCUMENTS

WO   2010116042 A1   10/2010

OTHER PUBLICATIONS

Shashank, "Android App Uses QR Code to Add Facebook Friends," http://fastgush.com/facebook/android-app-uses-qr-code-to-add-facebook-friends.html/, May 28, 2011, 4 pp.

(Continued)

*Primary Examiner* — Bharat N Barot
(74) *Attorney, Agent, or Firm* — Shumaker & Sieffert, P.A.

(57) ABSTRACT

Aspects of the disclosure provide techniques that enable a first user to add a second user to a social subnetwork of the first user's social network. In one example, a method may include discovering a second computing device associated with a second user. A first user associated with a first computing device and the second user may each be associated with a social networking service. The method may include receiving, from the second computing device, identification data associated with the second user. The method may include determining an identifier based at least in part on the identification data received from the second computing device. The identifier may identify the second user in the social networking service. The method may also include sending a request to a remote computing device to associate the second user with the social subnetwork of the first user.

27 Claims, 5 Drawing Sheets

(56) References Cited

U.S. PATENT DOCUMENTS

| | | | |
|---|---|---|---|
| 8,194,541 B2 | 6/2012 | Leppanen et al. | |
| 8,219,028 B1 | 7/2012 | Flamholz | |
| 8,255,469 B2 | 8/2012 | Leppanen et al. | |
| 8,306,514 B1 | 11/2012 | Nunally | |
| 8,700,710 B1 * | 4/2014 | Gallagher et al. | 709/204 |
| 2008/0005073 A1 | 1/2008 | Meek et al. | |
| 2009/0282130 A1 | 11/2009 | Antoniou et al. | |
| 2009/0292814 A1 | 11/2009 | Ting et al. | |
| 2010/0278345 A1 | 11/2010 | Alsina et al. | |
| 2012/0151015 A1 | 6/2012 | Plastina et al. | |
| 2013/0024576 A1 | 1/2013 | Dishneau et al. | |
| 2013/0097233 A1 | 4/2013 | Raman et al. | |

OTHER PUBLICATIONS

Whitinger, "NFC Could be the Next Driver in Social Networking," Mobile Tech News, http://www.mobiletechnews.com/info/2011/03/19/201732.html/, Mar. 19, 2011, 9 pp.

Kobler et al., "NFriendConnector-mobile social networking," Mashable The Social Media Guide, http://www.nfriendconnector.net/, accessed on Aug. 25, 2011, 3 pp.

Basu, "0-Click"NFC Sharing Coming to Android Ice Cream Sandwich,"" http://www.androidpolice.com/2011/05/11/io-2011-0-click-nfc-sharing-coming-to-android-ice-cream-sandwich/, accessed on Aug. 25, 2011, 4 pp.

Borghini, "VoiceBox Creative Sandbox: QR to NFC," http://voiceboxcreative.com/#/idesign/qrs-to-nfc/, Jun. 21, 2011, 2 pp.

Kurt, "NFC & RFID With Android," http://www.slideshare.net/todbotdotcom/nfc-rfid-on-android, accessed on Aug. 25, 2011, 5 pp.

Eaton, "Facebook Friending Tech to Test NFC at a Belgian Music Festival," http://www.fastcompany.com/1742315/want-to-see-how-nfc-could-change-everything-go-to-a-belgian-music-festival, Mar. 24, 2011, 2 pp.

Madrasgeek, Add Facebook Friends Instantly Via QR Code, http://www.madrasgeek.com/2011/06/add-facebook-friends-instantly-via-qr-code.html, Jun. 2, 2011, 5 pp.

VTT, "Hot in the City," http://hic.vtt.fi/index.html, accessed on Aug. 25, 2011, 2 pp.

Jide, "First Mobile Social Media Service That uses NFC," FuturePhone, http://futurephone.wordpress.com/tag/hot-in-the-city/, Jan. 9, 2009, 5 pp.

Sirra, "Hot in the City, NFC Enabled Mobile Social Media Service," VTT Technical Research Center of Finland, http://www.nfc-forum.org/events/2010_competition/2009_winners/2009_WIMA_VTT.pdf, accessed on Aug. 25, 2011, 7 pp.

"Instant Friend (Facebook)—Android Market," https://play.google.com/store/apps/details?id=com.instantfriend&featur%F4%80%82%AB, accessed on Aug. 25, 2011, 2 pp.

Relaxnews, "Business cards go digital and NFC enabled," The Independent, independent.co.uk/life-style/gadgets-and-tech/business-cards-go-digital-and-nfcenabled-2302159.html, accessed on Aug. 25, 2011, 1 p.

Tormanen, "The Impact of NFC on Multimodal Social Media Application," IEEE Xplore Digital Library, http://ieeexplore.ieee.org/Xplore/login.jsp?url=http%3A%2F%2Fieeexplore.ieee.org%2Fiel5%2F5476376%2F5476454%2F05476465.pdf%3Farnumber%3D5476465&authDecision=-203, abstract only, accessed on Aug. 25, 2011, 1 p.

* cited by examiner

CONSTRUCTING SOCIAL NETWORKS

RELATED APPLICATION

This application is a continuation of U.S. application Ser. No. 13/434,699, filed Mar. 29, 2012.

TECHNICAL FIELD

The disclosure relates to network communication, and more specifically, to social network environments.

BACKGROUND

Computers and mobile devices, such as cellular phones and personal digital assistants, have become increasingly interconnected due to the widespread availability of wired and wireless connections to communications networks such as the Internet. In one example, Internet-based communications may include web-based "social network" applications, in which a number of users are able to find other users' accounts and voluntarily become acquaintances. Users may post brief messages about their status, mood, activities, and their acquaintances may read and optionally reply to those messages. As such, acquaintances may stay abreast of each other's activities as a tool for maintaining their social bonds. Large numbers of people have embraced the use of electronic social networking services as tools for building and maintaining networks of personal, familial, academic, professional, and other interpersonal relationships.

SUMMARY

In one example, a method may include identifying, by a first computing device of a first user and using at least one communication channel (e.g., a wireless communication channel), a second computing device of a second user. The first user and the second user may each be associated with a social networking service. A social network associated with the first user may comprise a plurality of social subnetworks. The method may include receiving, by the first computing device and from the second computing device using the communication channel, identification data of the second user. The method may also include determining, by the first computing device, an identifier based at least in part on the identification data received from the second computing device. The identifier may identify the second user in the social networking service. The method may further include receiving, by the first computing device, a user input requesting to associate the second user with a social subnetwork of the first user. The method may also include sending, to a remote computing device that provides the social networking service, a request to associate the second user with the social subnetwork of the first user using the social networking service.

In one example, a computer-readable storage medium may be encoded with instructions that, when executed, cause one or more processors of a computing device to perform operations including identifying, using a short-range wireless communication channel, a second computing device of a second user. The first user and the second user may each be associated with a social networking service and the first user may be associated with the computing device. A social network associated with the first user may comprise a plurality of social subnetworks. The computer-readable storage medium may be encoded with instructions that, when executed, cause one or more processors of a computing device to perform operations including receiving, from the second computing device using the at least one short-range wireless communication channel, identification data of the second user. The computer-readable storage medium may be encoded with instructions that, when executed, cause one or more processors of a computing device to perform operations including determining an identifier based at least in part on the identification data received from the second computing device. The identifier may identify the second user in the social networking service. The computer-readable storage medium may be encoded with instructions that, when executed, cause one or more processors of a computing device to perform operations including receiving a user input requesting to associate the second user with a social subnetwork of the first user. The computer-readable storage medium may be encoded with instructions that, when executed, cause one or more processors of a computing device to perform operations including sending, to a remote computing device that provides the social networking service, a request to associate the second user with the social subnetwork of the first user using the social networking service.

In one example, a mobile computing device, includes one or more processors; a short-range communication device configured to: identify a plurality of computing devices, wherein a first user is associated with the mobile computing device and plurality of other users are associated with the plurality of computing devices, wherein the first user and the plurality of other users are each associated with a social networking service and wherein a social network associated with the first user comprises a plurality of social subnetworks, and receive, from the plurality of computing devices using the at least one short-range wireless communication channel, identification data of the plurality of other users; and a social networking module executable by the one or more processors to: determine identifiers of each of the plurality of other users based at least in part on the identification data received from the plurality of computing devices, wherein the identifiers identify the plurality of users in the social networking service, and send, to a remote computing device that provides the social networking service, a request to associate the plurality of users with a social subnetwork of the first user using the social networking service.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques that may facilitate a first user in adding a second user to the first user's social network, e.g., particularly to a social subnetwork of the first user's social network. Techniques of the disclosure may enable a user to initially discover other users of the social networking service using short-range communication, such as Near-Field Communication (NFC) or Bluetooth. For instance, a first mobile computing device of a first user may use short-range communication to discover a second mobile computing device, one that belongs to a second user. The second computing device may send a first identifier of the second user, such as the second user's first name, last name, email address, and/or phone number. Users can control the degree of discoverability and the automation of any transmission of any identifying information through settings, authorization, and security features.

In some examples, the first computing device may receive the first identifier and query a datastore that includes at least an association between the first identifier and a second identifier. The second identifier may be a unique identifier that identifies the second user in a social networking service. In some examples, the first identifier includes or is the unique identifier, or the unique identifier is broadcast with the first identifier information.

In some examples, the first computing device may poll other computing devices in proximity to the first computing device using short-range wireless communication to determine whether users that are associated with discovered computing devices are included in a social network of the user associated with the first computing device. In such examples, the first computing device may display those users that are in the social network of the first user or that use the social networking service.

In response to receiving the second identifier or otherwise identifying the second user, the first computing device may display representations of one or more social subnetworks. The first user may then provide a user input to generate a message that associates the second user with a selected social subnetwork associated with the first user. The message may be usable by a remote computing device to associate the second user with the selected social subnetwork of the first user. In this way, a first user can quickly and reliably add other users of a social networking service to a social subnetwork associated with the first user. Enabling a first user to quickly and reliably add a second user to a social subnetwork may enable the first user to determine which content associated with the first user may be shared with the second user. Consequently, techniques of the present disclosure may facilitate a first user in sharing content with new acquaintances in a granular manner using social subnetworks.

Figure 1:
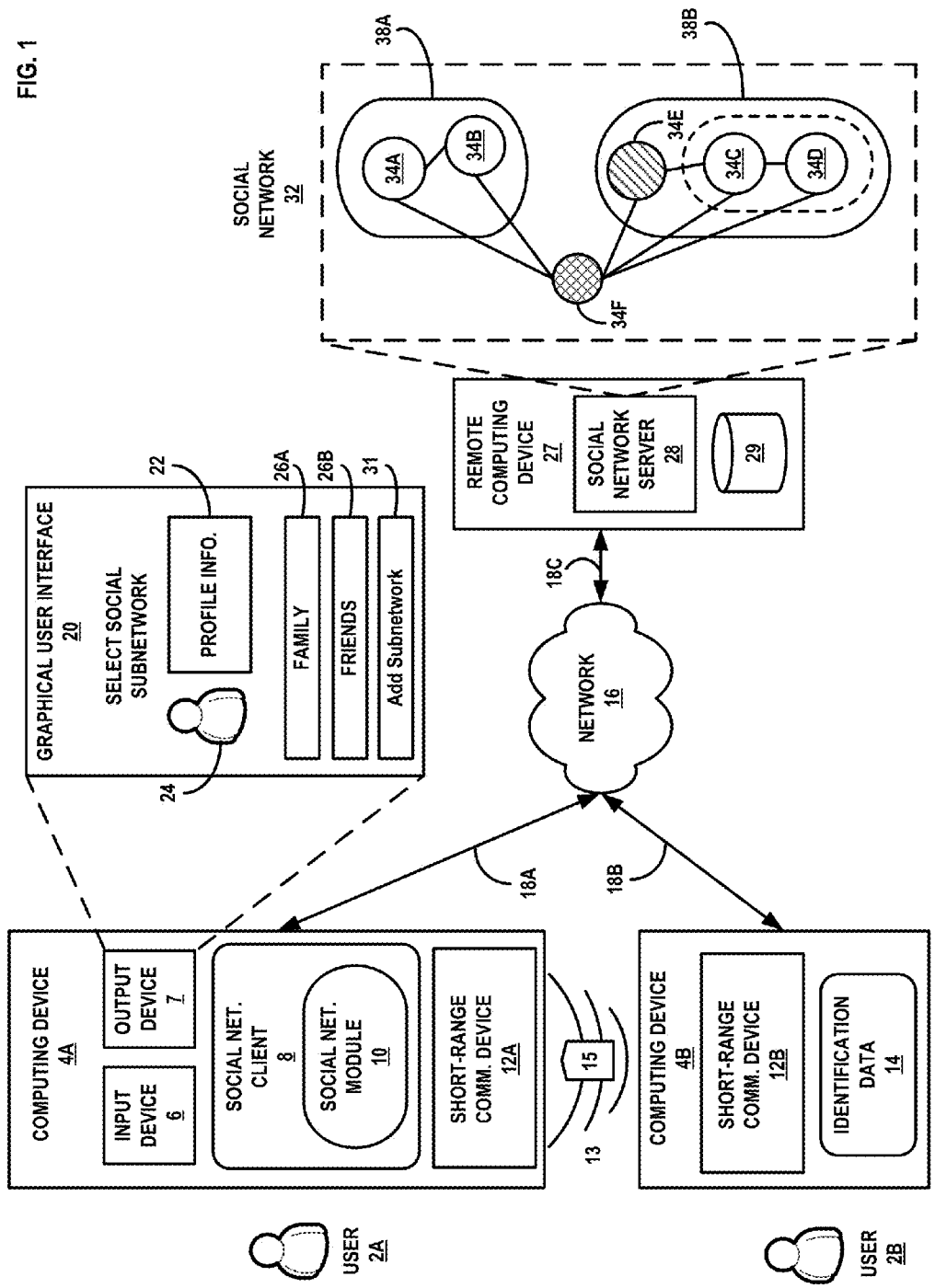
FIG. 1 is a block diagram illustrating an example of one or more computing devices coupled to a remote computing device that is configured to provide a computer-implemented social networking service, in accordance with one or more aspects of the present disclosure.

FIG. 1 is a block diagram illustrating an example of one or more computing devices 4A, 4B (collectively referred to as computing devices 4) coupled to a remote computing device 27 that provides a computer-implemented social networking service, in accordance with one or more aspects of the present disclosure. Computing device 4A may be associated with user 2A and computing device 4B may be associated with user 2B. As shown in FIG. 1, computing device 4A includes an input device 6, output device 7, social networking client 8, social networking module 10, and short-range communication device 12A. Computing device 4B includes a short-range communication device 12B and identification data 14. Remote computing device 27 further includes a social networking server 28 and datastore 29. Computing devices 4 and remote computing device 27 may be operatively coupled by communication channels 18A-18C, which in some examples may be wired or wireless communication channels capable of sending and receiving data. Examples of communication channels 18A-18C may include a User Datagram Protocol (UDP) network connection over the Internet or Transmission Control Protocol and/or Internet Protocol (TCP/IP) network connection over a wireless network. Network 16 as shown in FIG. 1 may be any wide area network (WAN) such as the Internet, or local area network (LAN).

As shown in FIG. 1, computing devices 4 may include, but are not limited to, portable or mobile devices such as mobile phones (including smart phones), laptop computers, desktop computers, tablet computers, and personal digital assistants (PDAs). Computing devices 4 may be the same or different types of devices. For example, computing device 4A and computing device 4B may both be mobile phones. In another example, computing device 4A may be a mobile phone and computing device 4B may be a tablet computer.

Computing device 4A may include input device 6. In some examples, input device 6 is configured to receive input from a user through tactile, audio, or video feedback. Examples of input device 6 may include a touch-sensitive and/or a presence-sensitive screen, mouse, keyboard, voice responsive system, or any other type of device for detecting a command from a user. Computing device 4A may also include output device 7. In some examples, output device 7 may be configured to provide output to a user using tactile, audio, or video stimuli. Output device 7, in one example, includes a touch-sensitive display, sound card, video graphics adapter card, or any other type of device for converting a signal into an appropriate form understandable to humans or machines. Additional examples of output device 6 may include a speaker, a cathode ray tube (CRT) monitor, a liquid crystal display (LCD), an organic light emitting diode (OLED), or any other type of device that can generate intelligible output to a user. Output device 6 may output content such as graphical user interface (GUI) 20 to user 2A. In some examples, output device 6 may be a touch screen that enables a user to provide one or more user inputs to interact with computing device 2.

In some examples, computing device 4A includes a short-range communication device 12A. In one example, short-range communication device 12A is capable of short-range wireless communication 13 using a protocol such as Bluetooth or Near-Field Communication. In one example, short-range wireless communication 13 may include a short-range wireless communication channel. Short-range wireless communication 13, in some examples, includes wireless communication between computing devices 4 of approximately 100 meters or less.

Short-range wireless communication 13 may include different modes of operation. For example, short-range wireless communication 13 may include an active mode and a passive mode of operation. In an active mode of operation, computing device 4A may generate a first radio field that is received by computing device 4B. In response, short-range communication device 12B of computing device 4B may generate a second radio field that is received by short-range communication device 12A. In this way, data may be communicated between computing devices 4.

In a passive mode of operation, load modulation techniques may be employed to facilitate data communication between computing devices 4. In a passive mode, computing device 4B does not generate a radio field in response to the radio field of short range communication device 12A. Instead, computing device 4B may include hardware that generates a change in impedance in response to a radio field. For example, short-range communication device 12A may generate a radio field that is received by computing device 4B. Hardware in computing device 4B may generate a change in impedance in response to the radio field. The change in impedance may be detected by short-range communication device 12A. In this way, load modulation techniques may be used by computing device 4A to receive information from computing device 4B. Other well-known modulation techniques including phase modulation and/or amplitude modulation may also be employed to facilitate data communication between computing devices 4.

In one example, computing device 4A may receive a data payload 15 from computing device 4B in response to receiving a radio field generated by short-range communication device 12A. In some examples, data payload 15 may include data that is stored and/or generated by computing device 4B. In some examples, data payload 15 may include some or all of identification data 14. Data payload 15 may also include other data generated, stored, and/or received by computing device 4B.

As shown in FIG. 1, computing device 4A may include a social networking client 8. Social networking client 8 may be an application executable by computing device 4A that further includes social networking module 10. Social networking module 10 may include one or more instructions that, when executed by computing device 4A, perform one or more techniques of the present disclosure. Social networking client 8 and social networking module 10 are further described in examples herein disclosed.

As shown in FIG. 1, computing device 4B may include short-range communication device 12B and identification data 14. In some examples, short-range communication device 12B may include similar or the same functionality as short-range communication device 12A of computing device 4A. In other examples, short-range communication device 12B may include functionality that is different from short-range communication device 12A.

In some examples, computing device 4B may store and or generate identification data 14. Identification data 14 may include data that identifies a user, such as user 2B associated with computing device 4B. For instance, identification data 14 may include a user's first name, last name, email address, phone number, and/or home or work address. In some examples, identifier data 14 may include a globally unique identifier (GUID) that uniquely identifies the user in a social network. Other identifier data includes keys and certificates, such as a public encryption key. Identification data 14 may, in some examples, be stored in a defined structure, such as XML or other file format. For instance, identification data 14 may be stored in a vCard, meCard, hCard, or the like.

In accordance with aspects of the present disclosure, users 2A and 2B may each use computing devices 4A and 4B to participate in a social networking service provided by remote computing device 27. Examples of remote computing device 27 may include a personal computer, a laptop computer, a handheld computer, a workstation, a data storage system, a supercomputer, or a mainframe computer. As shown in FIG. 1, remote computing device 27 includes social network server 28 and datastore 29. Social network server 28 may include one or more instructions that, when executed, perform functions to provide a social networking service.

In one example, users 2A and 2B associated with computing devices 4A and 4B access social network server 28 to participate in a social networking service. For example, the computing devices 4A and 4B can execute web browser applications that can be used to access the social networking service. In another example, the computing devices 4A and 4B can execute software applications that are specific to the social network (e.g., social networking "apps" running on smartphones, tablets, or other mobile devices). In one example, social networking client 8 may be a social networking application. It is also possible for users 2A and 2B to use other computing devices to access the social network server 28, e.g., after communicating identifier information, one or both users can interact using other devices, e.g., a desktop or laptop computer.

Users 2A and 2B interacting with the computing devices 4A and 4B can participate in the social networking service provided by the social network server 28 by distributing digital content, such as text comments (e.g., updates, announcements, replies), digital photos, videos, or other appropriate electronic information. In some implementations, information can be posted on a user's behalf by systems and/or services external to the social network or the remote computing device 27. For example, the user may post a review of a movie to a movie review website, and with proper permissions that website may cross-post the review to the social network on the user's behalf. In another example, a software application executing on a mobile device, with proper permissions, may query a location manager to determine the user's location and automatically update the social network with his location (e.g., "At Home", "At Work"). The location manager can provide location information, e.g., using global positioning system (GPS) capabilities, cell tower proximity, or other wireless signals.

Social network server 28 may further store and manage social networking data that represent associations between users that use the social networking service. For instance, each user may be connected to one or more other users of the social networking service provided by social network server 28. Social network server 28 may store the social networking data as objects that represent users and associations between users in datastore 29. Examples of social networking data may include a user's first name, last name, email address, phone number, home or work address, and/or globally unique identifier. Social networking data may also include interests, groups, activities, pictures, applications, and/or any other information associated with a user. Datastore 29 may include a database, lookup table, array, linked list, or any suitable data structure to store information. In some examples, a social network of a user may include other users associated with the user. The social network may further specify the associations between the user and each of the other users associated with the user. In some examples, social network server 28 may store information in datastore 29 that indicates when and/or where computing devices are within range of short-range wireless communication of other such computing devices. In one example, social network server 28 may store information in datastore 29 that indicates when and/or where computing device 4A has received identification data from computing device 4B.

As shown in FIG. 1, social network 32 may be a conceptual representation of user 2A's social network. Nodes 34A-34E may each represent a user of the social networking service provided by social network server 28. Node 34F may represent user 2A while object 34E may represent user 2B. Nodes 34A-34D may represent other users associated with user 2A and are therefore included in user 2A's social network 32.

Objects that represent the nodes, and therefore the users and the associations between each user, may be stored in datastore 29. Such objects may include various data and/or specify functionality of the objects. For instance an object associated with user 2A may store a group of all users associated with user 2A along with other information associated with user 2A (e.g., name, contact information, etc.). In this way, social network server 28 may manage social networks of each user that uses the social network service.

A user may further define one or more social subnetworks within a social network. For instance, as shown in FIG. 1, user 2A's social network 32 includes social subnetworks 38A-38C. For example, social subnetworks 38A-38C may be categories to which a user (e.g., user 2A) may assign their social networking contacts and better control the distribution and visibility of social networking posts. A social subnetwork can be defined by a data structure containing one or more elements and identifying a collection of users, e.g., users that are associated with one another in a computer-implemented social networking service. In some examples, the data structure may be stored in datastore 29 and managed by social network server 28.

Generally, a social subnetwork can be described from the perspective of an individual that is maintaining the social subnetwork, that is the center of a particular collection of socially interconnected people, or from the aggregate perspective of a collection of socially interconnected people. In some examples, the social subnetwork is maintained and accessible exclusively to the user that creates it, e.g., user 2A. A social subnetwork can have narrowly defined boundaries, all of the members of the social subnetwork may be familiar with one another, and permission may be required for a member to join a social subnetwork. In accordance with the present disclosure, a user of the social networking service can define a social subnetwork, and the social subnetwork, as a data set defining a collection of contacts, may reflect a real-life social subnetwork of the user. That is, a social subnetwork can reflect real-life social interactions between persons that the user may directly or indirectly associate with.

Though the creation and use of social subnetworks, the user can organize and categorize social networking contacts into various different groupings that can be used to control the visibility and access those contacts have to digital content distributed by the user. Example digital content can include textual postings, digital pictures, videos, audio files, hyperlinks (e.g., uniform resource indicators, URIs), and/or other digital content associated with the user's social networking profile. By using subnetworks, the user can post information exclusively to individuals or subnetworks for which the information is appropriate. Furthermore, social subnetworks can be used to give users control over the visibility of digital content distributions. Thus, in some examples, content associated with a social subnetwork may be inaccessible to users that are not associated with the social subnetwork using the social networking service, while users associated with the social subnetwork may access such content. As will be discussed below, the user may view the contacts in the user's various subnetworks prior to distributing information.

As shown in FIG. 1, social subnetwork 38A may include a collection of users associated with user 2A (e.g., represented by node 34F) who are each co-workers of user 2A. As shown in FIG. 1, users associated with user 2A are represented by nodes 34A-34E. Social subnetwork 38A may further be labeled as a "CO-WORKERS." In another example, social subnetwork 38B may include a collection of users associated with user 2A who are each friends of user 2A. In such examples, social subnetwork 38B may be labeled as "FRIENDS." User 2A may add users to suitable social subnetworks based on relationships between user 2A and users included in user 2A's social network. In this way, social subnetworks 38A-B enable user 2A to share content with users of various different social subnetworks in a precise and transparent manner.

In accordance with techniques of the present disclosure, social networking client 8 may enable a user 2A to quickly and easily add user 2B to a social subnetwork of user 2A's social network 32 using short range communication 13. For instance, as shown in FIG. 1, social networking client 8 may be executing on computing device 4A. In some examples, social networking client 8 may execute as a background or daemon process. In other examples, social networking client 8 may be initiated in response to a user input provided by user 2A to computing device 4A.

Social networking module 10 of social networking client 8 may, in response to receiving an event, cause short-range communication device 12A to discover computing device 4B using short range communication 13. In one example an event may be generated by computing device 4A in response to a user input at input device 6. In another example, an event may be automatically generated by and/or received from another software or hardware module. Short-range communication device 12A may discover computing device 4B by sending an initial request to short-range communication device 12B, using short-range communication 13, that requests communication capabilities of short-range communication device 12B. For instance, short-range communication device 12A may initiate a handshake process between short-range communication devices 12A-B. In the handshake process, short-range communication device 12B generate a response to short-range communication device 12A's request that includes data indicating one or more techniques (e.g., active or passive) usable by short-range communication device 12B to communicate with short-range communication device 12A. Short-range communication device 12A may discover short-range communication device 12A upon receiving the response from short-range communication device 12B indicating the one or more techniques. In some examples, the handshake process includes confirmation that the user of the device is a member of the social network service.

Upon discovering communication device 4B, social networking module 10 may send a request for identification data associated with user 2B to short-range communication device 12B. As previously described, identification data 14 may, in some examples, include for example, information that sufficiently identifies the user, such as a unique identifier, or one or more of: a user's first name, last name, email address, phone number, and/or home or work address. Identification data 14 may include an identifier that uniquely identifies user 2B in a social network. In some examples, identification data 14 may include a permanent identifier that unique identifies user 2B in a social network. In other examples, the unique identifier may be temporary and/or expire after a period of time or number of uses. Computing device 4A may use identification data 14 to determine the identify of user 2B in a social networking service and further retrieve information associated with user 2B in the social networking service. In some examples, short-range communication device 12B, in response to receiving the request, may send identification data 14 from identification data 14 to short-range communication device 12A using short-range communication 13. For instance, short-range communication device 12B may send the request to another module executing on computing device 4B. The module executing on computing device 4B may select identification data 14, which the module may send back to short-range communication device 12B. Short-range communication device 12B may include identification data in data payload 15, and send data payload 15 to short-range communication device 12A. In various examples, only a portion of identification data 14 may be sent to short-range communication device 12B while in other examples, all of identification data 14 may be sent to short-range communication device 12B.

In an alternative example, short-range communication device 12B may directly respond to the request by sending identification data 14 to short-range communication device 12A. For instance, short-range communication device 12B may be a passive radio-frequency identification tag that stores identification data 14. In such examples, short-range communication device 12B may directly send identification data 14 in response to a request from short-range communication device 12 without further processing by other modules on short-range communication device 12B.

In some examples, no user intervention may be required for short-range communication devices 12A and 12B to communicate. For example, user 2A may initially provide user input to computing device 4A such that short-range communication device 12A may automatically detect and receive identification data 14 from computing device 4B. User 2B may similarly provide a user input to configure computing device 4B to automatically send identification data 14 to computing device 4A in response to determining that short-range communication device 12A is communicating with short-range communication device 12B. In other examples, users 2A and/or 2B may be required to manually configure one or both of computing devices 4A and/or 4B to send and/or receive identification data. In some examples, user 2A may provide a user input to computing device 4A, such that computing device 4A must be physically touching computing device 4B to exchange identification data. Computing device 4B may be similarly configured by user 2B to only send identification data 14 when computing device 4B determines it is touch computing device 4A. In other examples, computing devices 4A and 4B may be required to perform a security handshake (e.g., an authorization of credentials) to exchange identification data. For example, computing device 4A prompt user 2A to enter a security code that is generated by computing device 4B. Computing device 4B, upon determining that computing device 4A has entered the correct security code, may then send the identification data to computing device 4A. If computing device 4B determines that user 2A has provided an incorrect security code, computing device 4B may not send identification data to computing device 4A. In various examples, information communicated between computing devices 4A and 4B may be encrypted. In some examples, the user may be required to manually enable or require encryption prior to sending the information. In other examples, the computing devices may be configured to automatically encrypt all information. Identification data stored on computing devices 4A and 4B may also be protected by various permissions and user access controls to control access to the data by various applications.

Short-range communication device 12A may send data payload 15 to social networking module 10. Social networking module 10 may subsequently determine an identifier that identifies user 2B in the social networking service provided by social network server 28. In some examples, the identifier may be an identifier that uniquely identifies user 2B in a social networking service. For instance, the identifier may be a globally unique identifier (GUID) associated with a user that is registered with a social networking service. The globally unique identifier may be a string of numbers and characters in one example.

In one example, to determine an identifier that identifies user 2B in the social networking service, social networking module 10 may send identification data 14 to social network server 28. As previously described, social network server 28 may store social networking data in datastore 29 that includes information about a user (e.g., user 2A) and associations between the user and other users. In some examples, the identifier (e.g., GUID), may be stored in the social networking data thereby allowing social network server to maintain information about each user that uses the social networking service.

In some examples, social network server 28 may compare identification data 14 received from social networking client 8 with social networking data stored in datastore 29. For instance, identification data 14 may include user 2B's first name, last name, email and phone number. Social network server 28 may query social networking data stored in datastore 29 to identify matches between identification data 14 and the social networking data in datastore 29. In one example, the first name, last name, and phone number of identification data 14 may match social networking data of datastore 29 that is associated with user 2B. In one example, the social networking data associated with user 2B may be stored as an object in datastore 29. Consequently, social network server 28 may select a GUID that is associated with the object, which stores the matching first name, last name, and phone number of user 2B. Social network server 28 may select the GUID associated with user 2B from the object and send the GUI to social networking client 8.

In some examples, computing device 4A and other computing devices in proximity to computing device 4B may each be capable of receiving identification data 14 from computing device 4B. However, in some examples, social network server 28 may only process requests for additional social networking data associated with user 2B from users that have accounts in the social networking service provided by social network server 28. In such examples, social network server 28 may determine whether the request includes authentication credentials which may include a username, password, token, or other credential, of a user associated with computing device that is requesting social networking data associated with user 2B. In this way, social network module 28 may not provide social networking data of user 2B in response to requests from computing devices that are associated with users who do not have accounts with the social networking service provided by social network server 28.

Although the current example illustrates the use of a first name, last name, email, and phone number, any combination of identification data 14 may be used by social network server 28 to query datastore 29 for matching identifiers that identify users of the social networking service provided by social network server 28. In some examples, some or all of the operations performed by social network server 28 may be performed at computing device 4A. For instance, computing device 4A may include one or more modules that perform the operations of social network server 28. In some examples, computing device 4A may further include a datastore that stores some or all of the data included in data store 29. In this way, some or all of the operations performed by remote computing device 27 as described may be performed at computing device 4A.

As described in some examples, social network server 28 may compare identification data 14 received from social networking client 8 with social networking data stored in datastore 29. Social network server 28, when performing a comparison, may perform exact matching between identification data 14 and social networking data stored in datastore 29. For instance, in the previous example, social network server 28 may only select GUIDs that are associated with a first name, last name, and phone number that exactly match identification data 14 received by social network server 28. In other examples, social network server 28 may perform partial matching to select GUIDs. For instance, if portions of identification data 14 match portions of social networking data stored in datastore 29, social network server 28 may select GUIDs of users that are identified by the partial match between identification data 14 and social network data stored in datastore 29. Social network server 28 may use various techniques to select one or more GUIDs. In one example, social network server 28 may determine probabilities of matches between portions of identification data 14 and social networking data. If the determined probability of a match exceeds a predetermined threshold value, social network server 28 may select the GUID from the social network data that matches the identification data. Other example identification techniques may include but are not limited to Knuth-Morris-Pratt, Boyer-Moore, and Rabin-Karp matching techniques. Thus, social network server 28, may select a group of one or more identifiers (e.g., GUIDs) based on comparisons between identification data 14 and datastore 29. As described in the previous examples, the identifiers may be sent to social networking client 8. Social network server 28 may further send social networking data associated with the identifiers to social networking client 8. In the present example, an identifier that identifies user 2B and social networking data associated with user 2B may be sent by social network server 28 to social networking client 8.

Social networking client 8, may initially receive the identifier from social network server 28. Upon receiving the identifier, social networking module 8 may cause output device 7 to display graphical user interface (GUI) 20. In this way, the displaying of GUI 20 is triggered by receiving identification data of user 2B. In other examples, the displaying of GUI 20 may be triggered by a user request. In some examples, social networking module 8 generates for display at least one of a visual representation of user 2B and a renders profile information associated with user 2B, wherein the profile information comprises one or more attributes associated with user 2B. For instance, GUI 20 may include profile picture 24, profile information 22, and social subnetwork controls 26A-B (collectively referred to herein as social subnet controls 26). Profile picture 24 may be a visual representation of user 2B that is associated with the identifier received from social network server 28. In some examples, profile picture 24 may be included in the social networking data sent by social network server 28 to social networking client 8. Profile information 22 may include further information associated with user 2B such as interests, groups, activities, and/or any other information associated with user 2B that maintained by social network server 28. In some examples, when multiple identifiers are received by social networking client 8 from social network server 28, social networking module 10 may cause output device 7 to include multiple profile pictures and/or profile information associated with each user identified by the identifiers.

As shown in FIG. 1, GUI 20 may further include social subnet controls 26A-26B. Social subnetwork controls 26, in some examples, may be graphical controls that, when selected in response to an event (e.g., an indication of user input provided at input device 6), cause social networking module 10 to associate a selected user with a social subnetwork. For instance, each social subnetwork control 26 may identify a social subnetwork that is associated with user 2A in the social networking service provided by social network server 28. Thus, as shown in FIG. 1, social subnetwork controls 26A-B may be associated respectively with social subnetworks 38A-38B. In one example, user 2A may wish to add user 2B to social subnetwork 38B. User 2A may provide an indication of user input at output device 7 to drag user profile image 24 to social subnetwork control 26B. In other examples, user 2A may provide an indication of user input by tapping social subnetwork control 26B. Any suitable user input technique may be used to select the desired social subnetwork control.

In some examples, social networking module 10 may enable user 4A to generate a new social subnetwork. For instance, social networking module 10 may include a graphical control 31 in GUI 20. When graphical control 31 is selected in response to a user input provided by user 4A, graphical control 31 may enable user 2A to create a new social subnetwork. For instance, upon selecting graphical control 31, social network module 10 may include an input field in GUI 20. User 2A may provide a user input at output device 7 that includes an input value representing a social subnetwork identifier (e.g., a name) to be assigned to a new social subnetwork. In some examples, upon providing the input value, social network module 10 may generate a message to create the new social subnetwork and further associate the social subnetwork identifier with a new social subnetwork. In some examples, the message may be sent to social network server 28 to generate the new social subnetwork.

In some examples, social network module 10 may identify all computing devices that are detectable by short-range wireless communication using short-range wireless communication device 12A. Social network module 10 may receive, from each of the computing devices using short-range wireless communication, identification data that identifies each of the plurality of users in the social networking service provided by social network server 28. In response to determining computing devices within range of communication device 4A, social networking module 10 may generate a request to create a social subnetwork that includes all of the users that are associated with the detected computing devices and user 2A (who is associated with computing device 4A). In some examples, social networking module 10 may send the request to remote computing device 27, which may create the social subnetwork and associate each of the users with the social subnetwork. In some examples, prior to sending the request to remote computing device 27, social network module 10 may prompt user 2A, via output device 7, to select or deselect whether some or all of the users associated with the detected computing devices may be associated with the social subnetwork. In this way, user 2A may provide one or more user inputs to select a subset of the users to include in the social subnetwork.

In some examples, in response to determining one or more of the computing devices within range of communication device 4A, social networking module 10 may determine which computing devices are associated with users that are included in user 2A's social network. In such examples, social networking module 4 may cause output device 7 to display the group of users included in user 2A's social network. Social networking module 10 may enable user 2A to update changes to contact information of the one of the users or indicate that user 2A is within a particular distance the user (e.g., within physical proximity of user 2A). Social networking module 10 may enable user 2A to provide user input that includes further details of the fact that user 2A is within a particular distance of the user. Such details may include time, place, event name, and other information.

In some examples, computing device 4A and/or remote computing device 27 may determine contextual information usable to generate a social subnetwork identifier that identifies a social subnetwork, and associate the social subnetwork identifier with the social subnetwork based at least in part on the contextual information. For instance, a social subnetwork identifier may be generated based on contextual information available to social networking module 10. For instance, contextual information may include a date and/or time of day, geoposition data, location check in information, calendar event information, or any other information that social networking module 10 may access. In one example, social networking module 10 may for example, generate a social subnetwork identifier that includes the current date and time. In another example, relationships between contextual information may be used to generate a social subnetwork identifier. For instance, social networking module 10 may generate a social subnetwork identifier based on the current date and time as well as geoposition data. If the date is January 1 and the geoposition indicates Times Square, New York, social networking module 10 may generate a social subnetwork identifier "New Years Eve in Times Square." In this way, social networking module 10 may use combinations of contextual data to generate a social subnetwork identifier. Other information may be available from calendar events, such as the title of an event occurring at the particular time that the social network information is received, the sponsor of the event, and other invitees.

Returning the current example, in response to receiving the indication of user input, social networking module 10 may generate a message. The message may include information usable by social network server 28 to associate a user 2B with social subnetwork 38B. In some examples, social networking module 10 may send the message to social network server 28. Social network server 28 may update social networking data in datastore 29 to indicate user 2B is now included in social subnetwork 38B of user 2A's social network 32. In some examples, where GUI 20 includes social networking data associated with multiple users identified by identifiers received from social network server 28, user 2A may perform multiple selections to associate one or more of the users with one or more of social subnetworks.

In some examples, social networking module 10 controls sharing of identification data based on the distance from computing device 4A to computing device 4B. For instance, if computing device 4A includes identification data associated with user 2A, social networking module 10 may share such identification data with computing device 4B when computing device 4B is less than a predetermined distance from computing device 4A. In one example, social networking module 10 may cause short-range communication device 12A to determine a distance from computing device 4A to computing device 4B. Social networking module 10 may determine whether the distance is less than a predetermined distance that may be specified by user 2A or some other hardware or combination of software and hardware. Exemplary predetermined distances may include 10 meters, 5 meters, 0.1 meters and 0.02 meters. If social networking module 10 determines the distance between computing devices 4A and 4B is less than the predetermined distance, social networking module 10 may send the identification data to computing device 4B. In another example, if the distance between computing devices 4A and 4B is less than a predetermined distance, computing device 4A may not send the identification data to computing device 4B.

In some examples, social networking module 10, upon receiving identification data 14 from computing device 4A, may determine whether computing device 4A received the identification at a location recognized social networking module 10. For instance, social networking module 10 may determine whether the location of computing device 4A and user 2A are at a known location, such as a place of business, salon, retail store, coffee shop, etc. If social networking module 10 determines computing device 4A is at a known location based on the location of computing device 4A, social networking module 10 may further determine whether sales information, such as an advertisement, incentive, etc. is associated with the known location. If such sales information is associated with the known location, social networking module 10 may display such information using output device 7. In some examples, social networking module 10 may query remote computing device 27 to determine if a known location is associated with the location of computing device 4A rather than performing one or more such operations locally on computing device 4A. In one example, social networking server 28 may determine that determine and/or include associations between known locations and sales information. Social networking server 28 may therefore select sales information associated with the known location using the location of computing device 4A and send the selected sales information to computing device 4A for display.

In some examples, computing device 4A sends the identification information of user 2A to computing device 4B by sending a request to the social networking service of remote computing device 27 in order to send the identification information of user 2A to computing device 4A or user 2B. For instance, the identification information user 2A may be sent to computing device 4B by sending a request to social networking server 28 such that social networking server 28 sends the identification information of user 2A to computing device 4B using network 16.

In some examples, computing device 4A receives user input from user 2A comprising a communication and a selection of at least one social subnetwork as recipient of the communication. Example communications may include text, photos, videos, etc. Social networking module 10 sends, to remote computing device 27, the communication and the selection of at least one social subnetwork as recipient of the communication, such that social networking server 28 permits access to the communication only to members of the at least one social subnetwork selected as recipient. Thus, such techniques allow user 2A to associate a communication with a social subgroup to control access of the communication to other users using the social networking service provided by social network server 28.

Techniques of the present disclosure may improve the ability of a user to exchange contact information in various settings and add other users to social subnetworks. In some examples, using a short-range communication channel in accordance with techniques of the present disclosure facilitate adding a user to a social subnetwork. For instance, by sending and receiving identification data via short-range communication, users may avoid exchanging contact information orally, in writing, or using other informal techniques. By avoiding such informal exchanges of information, techniques of the present disclosure may potentially eliminate errors and improve a user's efficiency to add and connect with other users. Techniques of the present disclosure may further potentially improve security by avoiding information exchanges of information, such as by oral or written communication. By transferring identification data using short-range communication, techniques of the disclosure may reduce the detectability of identification data.

Techniques of the present disclosure may improve the accuracy of adding another user to a social subnetwork by using different types of identification data to determine an identifier that identifies a user to be added to a social subnetwork. For instance, by using some or all identification data to determine an identifier that identifies a user (e.g., first name, last name, email address, phone number, etc.), techniques of the present disclosure may improve the accuracy by which a user may be identified. Moreover, in some examples, by using identification data that is stored in a vCard or other structured data, the need for both or either of the computing devices to be running a social networking client may be reduced or eliminated. For instance, in some examples, a first computing device may be running a social networking client that is used to add a user to a social subnetwork, while a second computing device may not run a social networking client but instead may simply store identification data associated with the added user. In this way, even if the second computing device is not running a social networking client, the first computing device may receive the identification data from the second computing device and add the user associated with the second computing device to a social subnetwork.

Techniques of the present disclosure may potentially improve the security of sharing identification data stored on one computing device with other computing devices. For instance, techniques of the disclosure may enable a user to define multiple, different groups of identification data that may be sent to other computing devices based on geoposition, time, social network, etc. In this way, techniques of the present disclosure provide a user with granular controls to share identification data, thereby improving user privacy and data security.

Figure 2:
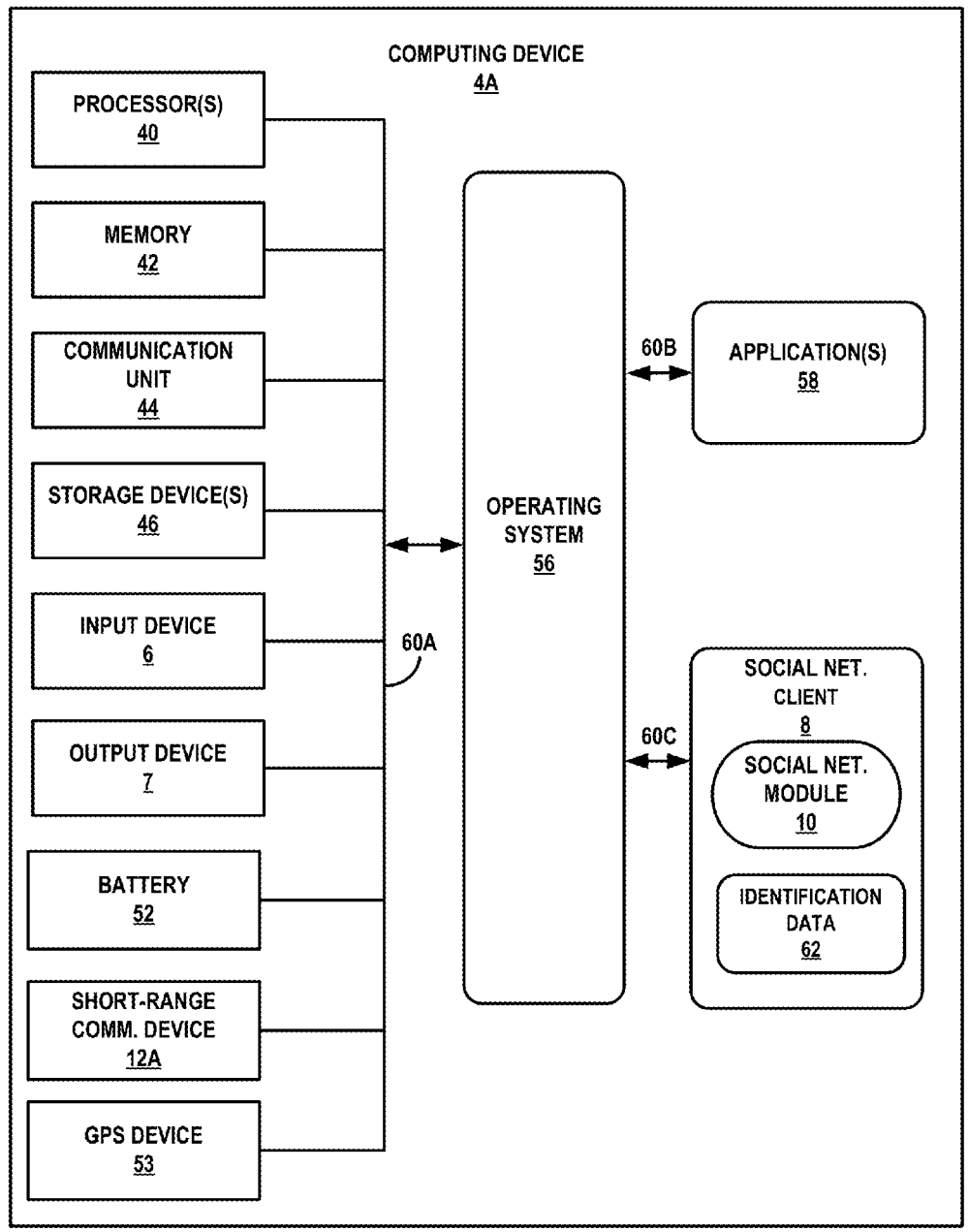
FIG. 2 is a block diagram illustrating one example of a computing device shown in FIG. 1, in accordance with one or more aspects of the present disclosure.

FIG. 2 is a block diagram illustrating one example of a computing device shown in FIG. 1. FIG. 2 illustrates only one particular example of computing device 4A, and many other example embodiments of computing device 4A may be used in other instances.

As shown in the specific example of FIG. 2, computing device 4A includes one or more processors 40, memory 42, a communication unit 44, one or more storage devices 46, input device 6, and output device 7. Computing device 4A also includes an operating system 56 that is executable by computing device 4A. Computing device 4A, in one example, further includes social network application 8 that is also executable by computing device 4A. Each of components 40, 42, 44, 46, 6, 7, 52, 12A, 56, 58, 8, and 10 may be interconnected (physically, communicatively, and/or operatively) by communication channels 60A-60C for inter-component communications.

Processors 40, in one example, are configured to implement functionality and/or process instructions for execution within computing device 4A. For example, processors 40 may be capable of processing instructions stored in memory 42 or instructions stored on storage devices 46. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

Memory 42, in one example, is configured to store information within computing device 4A during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 4A (e.g., applications 58 and/or social network application 8) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 4A, in some examples, also includes a communication unit 44. Computing device 4A, in one example, utilizes communication unit 44 to communicate with external devices via one or communication channels, such as one or more wired and/or wireless networks. Communication unit 44 may be a network interface card, such as an Ethernet card, an optical transceiver, a radio frequency transceiver, or any other type of device that can send and receive information. Other examples of such communication units may include 3G and WiFi radios in mobile computing devices as well as USB. In some examples, computing device 4A utilizes communication unit 44 to wirelessly communicate with external devices such as computing devices 4B and 28 of FIG. 1.

Computing device 4A, in one example, also includes one or more input devices 6. Input device 6, in some examples, is configured to receive input from a user through tactile, audio, or video feedback. Examples of input device 6 include a presence-sensitive screen, a mouse, a keyboard, a voice responsive system, video camera, microphone or any other type of device for detecting a command from a user.

One or more output devices 7 may also be included in computing device 4A. Output device 7, in some examples, is configured to provide output to a user using tactile, audio, or video stimuli. Output device 7, in one example, includes a presence-sensitive screen, a sound card, a video graphics adapter card, or any other type of device for converting a signal into an appropriate form understandable to humans or machines. Additional examples of output device 7 include a speaker, a cathode ray tube (CRT) monitor, a liquid crystal display (LCD), or any other type of device that can generate intelligible output to a user.

Computing device 4A, in some examples, include one or more batteries 52, which may be rechargeable and provide power to computing device 4A. Battery 52, in some examples, is made from nickel-cadmium, lithium-ion, or other suitable material. Computing device 4A may further include short-range communication device 12A as described in FIG. 1.

Computing device 4A, in some examples, may include a Global Positioning System (GPS) device 53. In some examples, GPS device 53 may send and receive information from a global navigation satellite system. In some examples, GPS device 53 may receive one or more physical location coordinates from the global satellite system that indicates a position of computing device 4A. Thus, in some examples, GPS device 53 may enable computing device 4A to determine its physical location based on the one or more physical location coordinates.

Computing device 4A may include operating system 56. Operating system 56, in some examples, controls the operation of components of computing device 4A. For example, operating system 56, in one example, facilitates the interaction of one or more applications and/or modules with processors 40, memory 42, communication unit 44, storage device 46, input device 6, output device 7, battery 52, and short-range communication device 12A.

As shown in FIG. 2, social networking client 8 may further include social networking module 10 as described in FIG. 1 and identification data 62. Applications 58, social networking client 8, social networking module 10, and operating system 56 may each include program instructions and/or data that are executable by computing device 4A. For example, Applications 58, social networking client 8, social networking module 10, and operating system 56 may include instructions that, when executed, cause computing device 4A to perform one or more of the operations and actions described in the present disclosure.

In one example, social networking module 10 may cause short-range communication device 12A to discover computing device 4B using a short-range wireless communication channel. Computing device 4B may be associated with user 2B, and user 2A and user 2B may each be associated with a social networking service provided by remote computing device 27. In one example, social networking module 10 may cause short-range communication device 12A to discover computing device 4B in response to an indication of user input received at input device 6. In other examples, social networking client 8 may run as a background process that causes short-range communication device 12A to periodically scan for other computing devices with which it can communicate.

In one example, social networking module 8 may receive identification data from computing device 4B using short-range communication device 12A. For instance, identification data may include a first name, last name, and email address of a user associated with computing device 4B. Social networking module 10 may determine an identifier that identifies user 2B based at least in part on the identification data received from computing device 4B. In one example, to determine the identifier, social networking module 10 may send a request to query a datastore that includes social networking data associated with user 2B. The datastore may be stored on a remote computing device or on computing device 4A. When the datastore is stored on a remote computing device, social networking module 10 may cause communication unit 44 to send the request to the remote computing device and receive an identifier that identifies the social user in the social networking service. In either case, social networking module 10 may receive the identifier that identifies user 2B.

Upon receiving the identifier that identifies user 2B, social networking module may cause output device 7 to display one or more social subnetwork controls. Each social subnetwork control may be associated with a social subnetwork of user 4A. Social networking module 10 may receive an indication of user input from input device 6 that requests generation of a message to associate the identifier of user 2B with a social subnetwork of user 2A. For instance, the indication of user input may select a social subnetwork control associated with the social subnetwork of user 2A to which social networking module 10 will associate the identifier of user 2B.

As shown in FIG. 2, computing device 4A may further include identification data 62. In some examples, identification data 62 may be associated with or included in social networking client 8. In other examples, identification data 62 may be stored and/or managed separately from social networking client 8. Identification data 62 may be similar to identification data 14 as shown in FIG. 1. For example, identification data 62 may include all, some, and/or different types of information (e.g., first name, last name, email address, etc.) as described with respect to identification data 14. In the example of FIG. 1, identification data 62 may be associated with user 2A and further include information associated with user 2A.

In any case, social networking module 10 may cause short-range communication device 12A to send identification data 62 to another computing device. For instance, in one example, social networking module 10 may cause short-range communication device 12A to send identification to computing device 4B in response to being discovered by computing device 4B. In other examples, social networking module 10 may cause short-range communication device 12A to send identification to computing device 4B in response to generating the message to associate the identifier of user 2B with a social subnetwork of user 2A. In still other examples, social networking module 10 may cause short-range communication device 12A to send identification to computing device 4B in response to determining an identifier associated with user 2B based at least in part on identification data received from computing device 4B.

In some examples, social networking module 10 controls at least one of a type or content of identification information that is sent computing device 4A to computing device 4B as a function of the geoposition of computing device 4A. For instance, social networking module 10 may send identification data 62 to computing device 4B based at least in part on a geoposition of computing device 4B. For instance, social networking module 10 may cause GPS device 53 to determine a geoposition of computing device 4B. A geoposition of computing device 4A may include coordinates that specify a location of computing device 4A in a geopositioning coordinate system.

In some examples, social networking module 10 may enable user 4A to define one or more groups of identification data 62 that are each associated with a geoposition. Each group may include some or all of identification data 62. For instance, a first "personal" group of identification data 62 may include personal information associated with user 4A. In some examples, a group of identification data 62 may be referred to as a "persona" or "profile." A second "work" group of identification data 62 may include business information associated with user 4A. Each of the first and second groups may be associated with first and second geopositions, respectively. Social networking module 10, upon determining a geoposition of computing device 4A may further determine whether the geoposition of computing device 4A is within a predetermined distance from the first and second geopositions. When the geoposition of computing device 4A is within a predetermined distance from the first geoposition, social networking module 10 may cause short-range communication device 12A to send the personal group of identification data 62 to computing device 4B. When the geoposition of computing device 4A is within a predetermined distance from the second geoposition, social networking module 10 may cause short-range communication device 12A to send the work group of identification data 62 to computing device 4B.

In some examples, the predetermined distance may be user-defined. Social networking module 10 may further enable a user to configure one or more groups of identification data 62 that are each associated with pre-defined geopositions. While the present example determines a distance between the geoposition of computing device 4A and pre-defined geopositions, social networking module 10 may alternatively be implemented using geoposition ranges wherein social networking module 10 determines if a geoposition of computing device 4A is within a pre-defined geoposition range that is associated with a group of identification data 62. If the geoposition of computing device 4A is not within a pre-defined range associated with a group of identification data 62, social networking module 10 may refrain from sending any identification data 62 to computing device 4B.

In some examples, social networking module 10 is configured to control at least one of a type or content of identification information that is sent by computing device 4A to computing device 4B, as a function of the local time of the computing device 4A. For instance, social networking module 10 may send identification data 62 to computing device 4B based at least in part on a timestamp that indicates a current time associated with computing device 4A. For instance, social networking module 10 may cause processor 40 to determine a current time associated with computing device 4A. In some examples, a current time may be received from a network time server using communication unit 44. In other examples, a current time may be stored in memory 42 or storage device 46. In any case, the current time may be represented a timestamp that includes values such as current date, hour, minute, second, etc.

In some examples, social networking module 10 may enable user 4A to define one or more groups of identification data 62 that are each associated with a time range. Each group may include some or all of identification data 62. For instance, a first "personal" group of identification data 62 may include personal information associated with user 4A. In some examples, a group of identification data 62 may be referred to as a "persona" or "profile." A second "work" group of identification data 62 may include business information associated with user 4A. Each of the first and second groups may be associated with first and second time ranges, respectively. Social networking module 10, upon determining a timestamp that indicates a current time of computing device 4A may further determine whether the timestamp of computing device 4A is within a time range associated with the personal group or work group of identification data 62. When the timestamp is within the first time range, social networking module 10 may cause short-range communication device 12A to send the personal group of identification data 62 to computing device 4B. When the timestamp is within the second time range, social networking module 10 may cause short-range communication device 12A to send the work group of identification data 62 to computing device 4B.

In some examples, the time ranges may be user-defined. For instance, social networking module 10 may enable a user to configure one or more groups of identification data 62 that are each associated with pre-defined time ranges. If the timestamp that indicates the current time of computing device 4A is not within a pre-defined time range associated with a group of identification data 62, social networking module 10 may refrain from sending any identification data 62 to computing device 4B.

In some examples, computing device 4A is configured to control at least one of a type or content of identification information that is sent by computing device 4A to the computing device 4B or user 2B as a function of social networking information about user 2B. For instance, social networking module 10 may send identification data 62 to computing device 4B based at least in part on a user's social network, such as social network 32 of user 4A as shown in FIG. 1. In one example, social networking module 10 may determine whether user 2B is associated with (e.g., is a contact or friend) at least one user included in user 2A's social network 32. For instance, social networking module 10 may send a request to query a datastore (e.g., datastore 29) that includes social networking data. The request may include an identifier that identifies user 2B. The request may query the datastore using the identifier to determine whether at least one user included in user 2A's social network 32 is associated with user 2B. Social networking module 10 may receive a response to the query that indicates whether at least one user included in user 2A's social network 32 is associated with user 2B.

When user 2B, for example, is not associated with at least one user included in user 2A's social network 32, social networking module 10 may refrain from sending identification data 62 to computing device 4A. When user 2B is associated with at least one user included in user 2A's social network 32, social networking module 10 may send identification data 62 to computing device 4A. In some examples, different groups of identification data 62 may be defined by user 2A using social networking module 10. In such examples, user 4A may configure social networking module 10 to send different groups of identification data 62 based on associations and/or the absence of associations between user 2B and other users in user 2A's social network 32.

In some examples, social networking module 10 may send identification data 62 to computing device 4B based at least in part on an access control list. An access control list may specify one or more rules that may be used by social networking module 10 to determine whether to send identification data 62 to computing device 4A. Each of the rules may be associated with an indication of a user such as a unique identifier, group, etc., associated with the user. Two examples of access control lists may include a blacklist and a whitelist. A blacklist may include one or more identifiers that identify users for which social networking module 10 may not send identification data to computing device 4B. A whitelist may include one or more identifiers that identify users for which social networking module 10 may send identification data to computing device 4B.

In one example, social networking module 10 may determine whether user 2B is included in a blacklist. The access control list may be stored on computing device 4A or a remote computing device. Social networking module 10 may send a request to query the blacklist. The request may include an identifier that identifies user 2B. The request may query the blacklist using the identifier to determine whether user 2B is included in the blacklist. Social networking module 10 may receive a response to the query that indicates whether the identifier associated with user 2B is included in the blacklist. When the identifier associated with user 2B is included in the blacklist, social networking module 10 may refrain from sending identification data 62 to computing device 4B that may be associated with user 2B. In some examples, different groups of identification data 62 may be defined by user 2A using social networking module 10. In such examples, user 4A may configure social networking module 10 to send different groups of identification data 62 based on different access control lists defined by user 2A.

Figure 3:
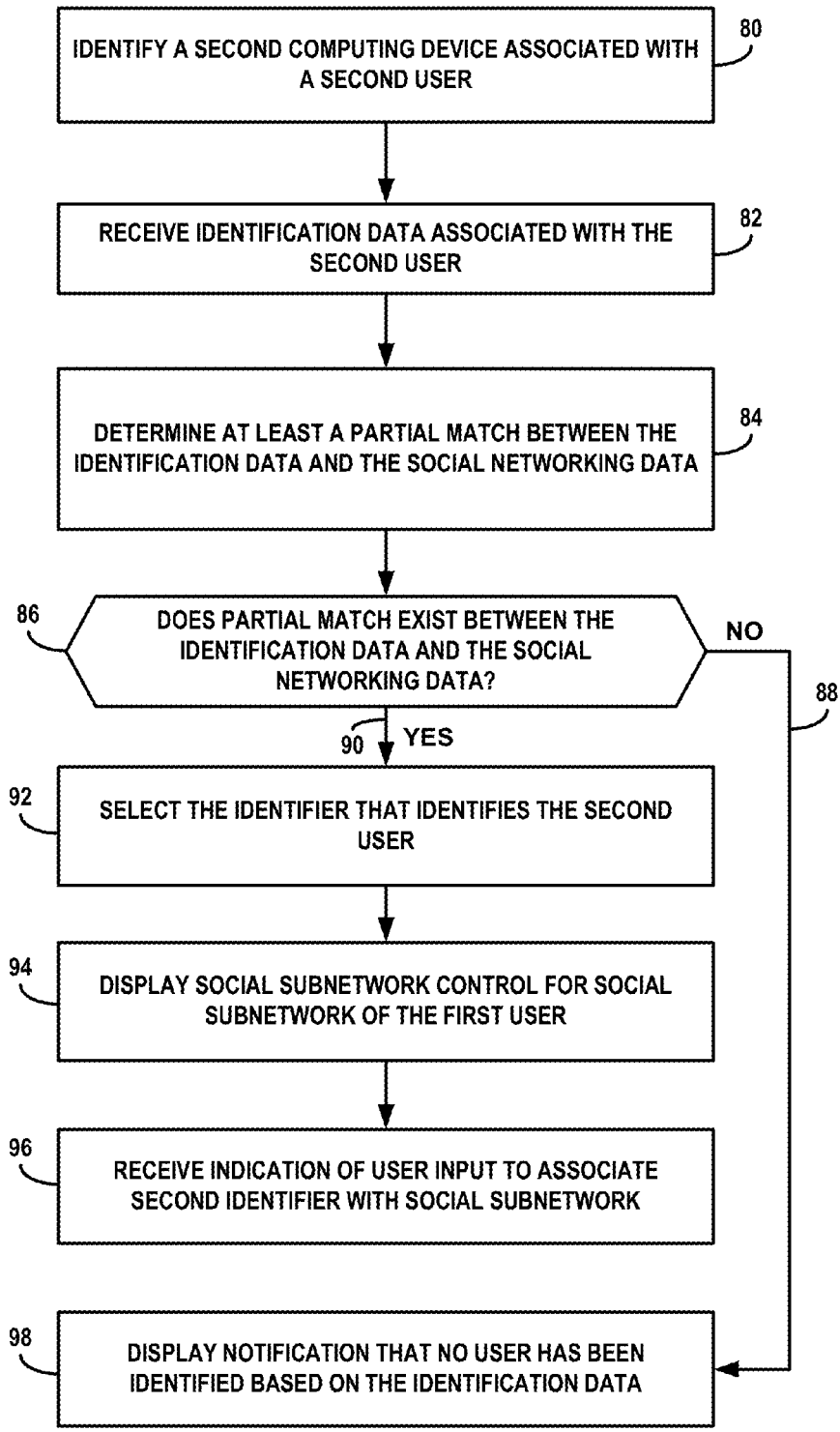
FIG. 3 is a flow diagram illustrating example operations of a computing device that enable a first user to add a second user to a social subnetwork of the first user's social network using short-range communication, in accordance with one or more aspects of this disclosure.

FIG. 3 is a flow diagram illustrating example operations of a computing device that enable a first user to add a second user to a social subnetwork of the first user's social network using short range communication, in accordance with one or more aspects of this disclosure. For purposes of illustration only, the example operations described below within the context of computing device 4A as shown in FIG. 1.

In one example, communication module 10 may discover, using a short-range wireless communication channel, computing device 4B (80). Computing device 4B may be associated user 2B and computing device 4A may be associated with computing device 2A. In response to discovering computing device 4B, communication module 10 may receive from computing device 4B, using the short-range wireless communication channel, identification data associated with user 2B (82). The identification data may include a first name, last name, and email address associated with user 2B. In one example, social networking module 10 may compare the identification data to social networking data stored in a datastore (84) to determine a least a partial match between the identification data and the social networking data (86). In an alternative example, computing device 4B may broadcast a social network identifier associated with user 2B, which computing device 4A may use to directly select social networking data associated with user 2B from datastore 29, in accordance with techniques of the disclosure. Returning to FIG. 3, when social networking module 10 determines at least a partial match does not exist (88), social networking module 10 may cause an output device of computing device 4A to display a notification that no user has been identified based on the identification data (98).

When social networking module 10 determines at least a partial match does exist tween the identification data and the social networking data (90), social networking module 10 may select the identifier that identifies user 2B (92). In some examples, social networking module 10 may generate for display at least one social subnetwork control that is associated with a social subnetwork of user 4A (94). User 4A may provide an indication of user input that is received by social networking module 10, and which social networking module 10 may use to generate a message to associate the identifier that identifies user 2B with a social subnetwork of user 2A (96). For instance, the indication of user input received by social networking module 10 may select a social network control to associate the identifier that identifies user 2B with the social subnetwork associated with the selected social network control.

Figure 4:
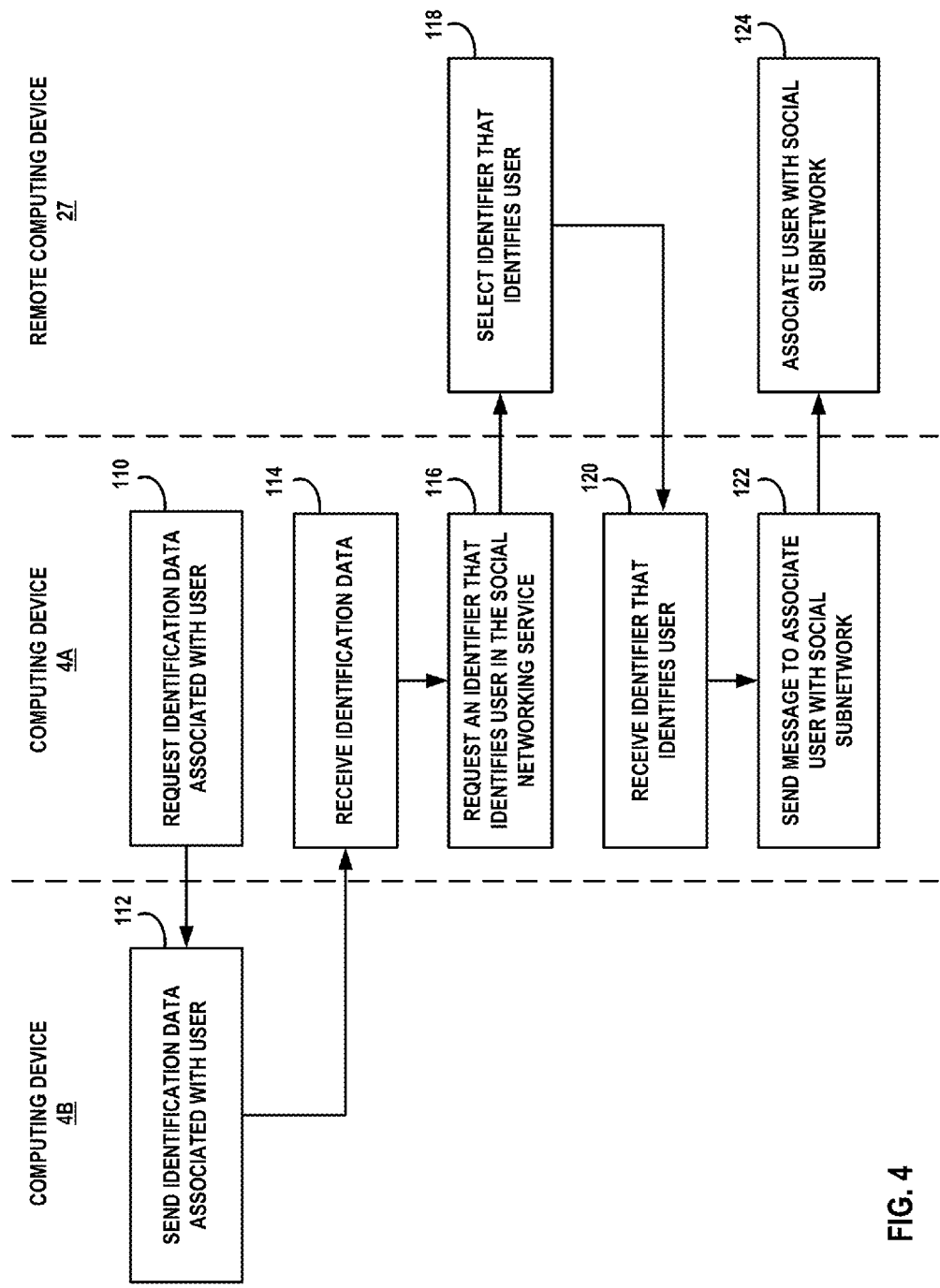
FIG. 4 is a flow diagram illustrating example operations of computing devices that enable a first user to add a second user to a social subnetwork of the first user's social network using short-range communication, in accordance with one or more aspects of this disclosure.

FIG. 4 is a flow diagram illustrating example operations of computing devices that enable a first user to add a second user to a social subnetwork of the first user's social network using short range communication, in accordance with one or more aspects of this disclosure. For purposes of illustration only, the example operations are described below within the context of remote computing device 27 and computing devices 4A and 4B as shown in FIG. 1.

As shown in FIG. 4, computing device 4A may initially discover computing device 4B using a short-range wireless communication channel. In some examples, computing device 4A may request identification data associated with user 2B that is stored by computing device 4B (110). In an alternative example, short-range wireless communication may support passive broadcasting. In such examples, computing device 4B may passively broadcast identification, which may eliminate the need for computing device 4A to explicitly request the identification data from computing device 4B. In this way, computing device 4A may capture the identification data when in range of computing device 4B. Returning to FIG. 4, in response to receiving the request, computing device 4B may send the identification data associated with user 2B to computing device 4A (112). Computing device 4A may receive the identification data (114).

In some examples, computing device 4A may determine an identifier based on the identification received from computing device 4A. For instance, computing device 4A may request from remote computing device 27, an identifier that identifies user 2B in a social networking service provided by remote computing device 27 (116). In response to receiving the request, remote computing device 27 may select the identifier that identifies user 2B (118). In one example, to select the identifier that identifies user 2B, remote computing device 27 may query a datastore that includes social networking data to identify a match between the identification data and the social networking data. In some examples, the identifier that identifies user 2B may be send to computing device 4A.

In some examples, computing device 4A may receive the identifier that identifies user 2B (120). In response to receiving the identifier, computing device 4A may generate a message that is usable to associate user 2B with a social subnetwork of user 2A. For instance, computing device 4A may receive a user input to associate the identifier that identifies user 2B with a social subnetwork of user 2A. Computing device 4A may send the message to remote computing device 27 (122). Remote computing device 27 may receive the message and associate the identifier that identifies user 2B with the social subnetwork selected by user 2A (124).

Figure 5:
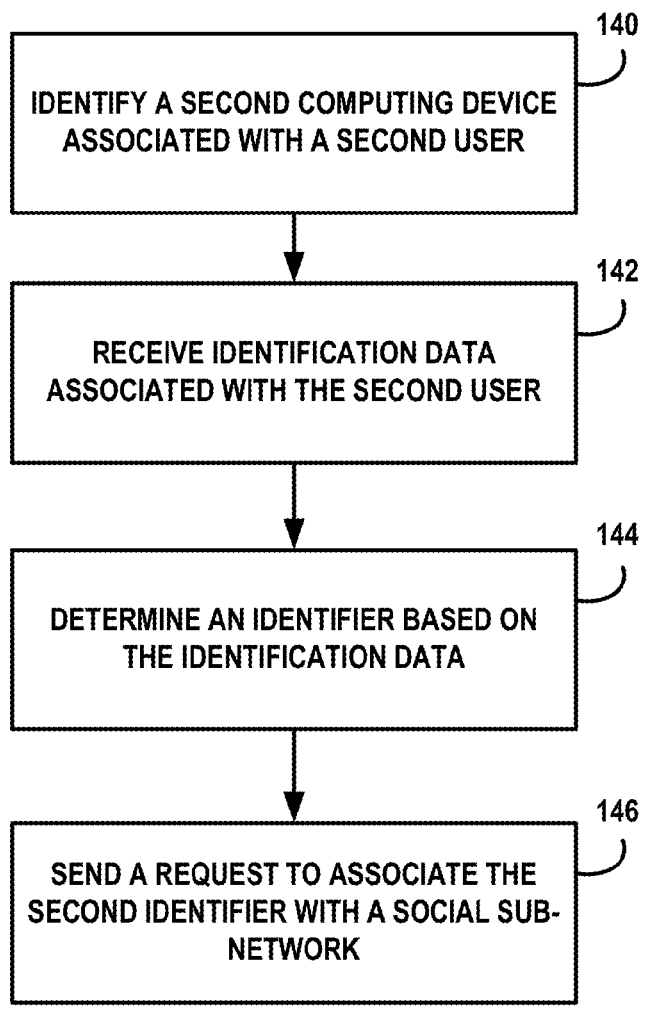
FIG. 5 is another flow diagram illustrating example operations of a computing device to enable a first user to add a second user to a social subnetwork of the first user's social network using short-range communication, in accordance with one or more aspects of this disclosure.

FIG. 5 is another flow diagram illustrating example operations of a computing device to enable a first user to add a second user to a social subnetwork of the first user's social network using short range communication, in accordance with one or more aspects of this disclosure. The example operations illustrated in FIG. 5 may be performed by computing device 4A as shown in FIGS. 1 and/or 2. The operations of FIG. 5 may include identifying, by a first computing device associated with a first user and using at least one short-range wireless communication channel, a second computing device associated with a second user, wherein the first user and the second user are each associated with a social networking service (140).

The operations may also include receiving, by the first computing device and from the second computing device using the at least one short-range wireless communication channel, identification data associated with the second user (142). In some examples, the operations may include determining an identifier based at least in part on the identification data received from the second computing device, wherein the identifier identifies the second user in the social networking service (144). The operations may include receiving, by the first computing device, an indication of user input requesting generation of a message to associate the identifier with a social subnetwork associated with the first user, wherein the social subnetwork is included in a social subnetwork associated with the first user (146).

In some examples, the operations may include determining, by the first computing device, a first geoposition of the first computing device; determining, by the first computing device, that the first geoposition is within a predetermined distance from a second geoposition that is associated with identification data of the first user; and when the first geoposition is within the predetermined distance from the second geoposition, sending, by the first computing device, identification data of the first user to the second computing device.

In some examples, the operations may include determining, by the first computing device, a timestamp that indicates a current time associated with the first computing device; determining, by the first computing device, that the timestamp is within a time range associated with identification data of the first user; and when the timestamp is within the time range, sending, by the first computing device, identification data of the first user to the second computing device. In some examples, the operations may include determining, by the first computing device, whether the second user is associated with at least one user included in the social network; and when the second user is not associated with at least one user included in the social network, refraining, by the first computing device, from sending identification data associated with the first user to the second user.

In some examples, the operations may include determining, by the first computing device, whether an indication associated with the second user is included in an access control list; and when the indication associated with the second user is included in an access control list, sending, by the first computing device, identification data associated with the first user to the second user. In some examples, the operations may include generating for display, by the first computing device, at least one social subnetwork control associated with the social subnetwork of the first user, wherein the indication of user input comprises a selection of the at least one social subnetwork control.

In some examples, the operations may include generating for display, by the first computing device, at least one of a visual representation of the second user and profile information associated with the second user, wherein the profile information comprises one or more attributes associated with the second user. In some examples, the operations may include sending a request to query a datastore that comprises social networking data associated with the second user; and in response to sending the request, receiving the identifier that identifies the second user in the social networking service. In some examples, the datastore is stored on a remote computing device.

In some examples, the operations may include sending to a remote computing device, by the first computing device, the message to associate the second identifier with the social subnetwork of the social networking service that is associated with the first user, wherein the social networking service is provided the remote computing device. In some examples, the operations may include determining a second identifier based on the identification data received from the second computing device, wherein the second identifier identifies a third user in the social networking service; and generating for display, by the first computing device, at least one of a visual representation of the third user and profile information associated with the third user, wherein the profile information comprises one or more attributes associated with the third user.

In some examples, the operations may include sending, by the first computing device, a second identifier to the second computing device that identifies the first user. In some examples, the operations may include comparing the identification data to social networking data included in a datastore to determine at least a partial match between the identification data and the social networking data, wherein the social networking data comprises information associated with users of the social networking service; and when at least the partial match exists between the identification data and the social networking data, selecting the identifier that identifies the second user.

In some examples, the operations may include receiving, by the first computing device, a second indication of user input to generate the social subnetwork; and in response to the second indication, generating, by the first computing device, the message to create the social subnetwork in the social networking service. In some examples, the operations may include selecting, by the first computing device, contextual information usable to generate a social subnetwork identifier that identifies the social subnetwork; determining, by the first computing device, one or more relationships between the contextual information; generating, by the first computing device, the social subnetwork identifier based at least in part on the one or more relationships between the contextual information; and associating, by the first computing device, the social subnetwork identifier with the social subnetwork.

In some examples, the operations may include sending, to the second computing device of the second user, by the first computing device or a remote computing device of the social networking service, identification information of the first user. In other examples, the first computing device sends the identification information of the first user directly to the second computing device using the at least one short-range wireless communication channel. In some examples, the first computing device sends the identification information of the first user to the second computing device by sending a request to a remote computing device of the social networking service to send the identification information of the first user to the second computing device or the second user. In some examples, the first computing device is configured to control at least one of a type or content of identification information that is sent by the first computing device as a function of the geoposition of the first computing device.

In some examples, the identifier comprises a globally unique identifier (GUID) that identifies the second user in the social networking service. In some examples, identification data is stored in a vCard, meCard, XML, or hCard. In some examples, identification data comprises data selected from a group consisting of a first name, last name, phone number, address, and an email address associated with the second user.

In other examples, the first computing device is configured to control at least one of a type or content of identification information that is sent by the first computing device as a function of the local time of the first computing device. In some examples, the first computing device is configured to control at least one of a type or content of identification information that is sent by the first computing device to the second computing device or the second user as a function of social networking information about the second user. In other examples, the method includes sending, by the first computing device, a request comprising at least a portion of the identification data of the second user to query a datastore on a remote computing device that comprises unique identifiers associated with users in a social networking service; and in response to sending the request, receiving, by the first computing device, a unique identifier that identifies the second user in the social networking service.

In some examples, the identification data received from the second computing device comprises a unique identifier that identifies the second user in the social networking service, and the first computing devices receives social network data about the second user by sending the unique identifier a remote computing device of the social networking service. In some examples, the operations include displaying, by the first computing device, an interface that indicates a plurality of social subnetworks of the first user and that accepts the user inputs of one or more selected social subnetworks in which to include the second user. In some examples, the displaying is triggered by receiving identification data of the second user. In some examples, the displaying is triggered by a user request.

In some examples, the operations includes generating for display, by the first computing device, at least one of a visual representation of the second user and a rendering of profile information associated with the second user, wherein the profile information comprises one or more attributes associated with the second user. In some examples, the operations may include receiving by the first computing device input from the first user comprising a communication and a selection of at least one social subnetwork as recipient of the communication, and sending, to the remote computing device of the social networking service, the communication and the selection of at least one social subnetwork as recipient of the communication, such that the social networking service permits access to the communication only to members of the at least one social subnetwork selected as recipient.

In some examples, the operations include determining, by the first computing device, contextual information usable to generate a social subnetwork identifier that identifies the social subnetwork; and associating, by the first computing device, the social subnetwork identifier with the social subnetwork based at least in part on the contextual information.

In one example, example operations may include detecting, by a first computing device of a first user using at least a wireless signal, a second computing device of a second user, wherein the first user and the second user are each associated with a social networking service, wherein a social network associated with the first user comprises a plurality of social subnetworks. The operations may also include exchanging identifying information between the first computing device and the second computing device by, sending, from the first computing device, identifying information for the first user or the first computing device and by receiving at the first computing device identifying information for the second user or the second computing device. The example operations may further include displaying, at the first computing device, an interface to prompt the first user to at least select or generate one or more social subnetworks with which the second user is to be associated. The example operations may also include sending, by the first computing device, to a remote computing device of a social networking service, a request to associate the second user with a selected or generated social subnetwork of the first user. The example operations may further include receiving, by the first computing device, user input from the first user comprising a communication and a selection of the selected or generated social subnetwork to be associated with the communication. The example operations may also include sending, by the first computing device and to the remote computing device, the communication and the selection of the selected or generated social subnetwork as recipient of the communication, such that the social networking service permits access to the communication only to members of the selected or generated social subnetwork.

In some examples, the example operations include identifying information for at least one of the first user or the second user is exchanged using one or more remote computing devices in communication with the first computing device and the second computing device. In some examples, the first and second users are each logged into accounts of the social networking service that associate each of the first and second users with their respective devices.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

The invention claimed is:

1. A method comprising:
   identifying, by a first computing device of a first user and using at least one short-range wireless communication channel, a second computing device of a second user, wherein the first user and the second user are each associated with a social networking service, wherein a social network associated with the first user comprises a plurality of social subnetworks, and wherein the second computing device is in proximity to the first computing device within a range of the at least one short-range wireless communication channel;
   receiving, by the first computing device and from the second computing device using the at least one short-range wireless communication channel, identification data of the second user;
   determining, by the first computing device, an identifier of the second user based at least in part on the identification data received from the second computing device, wherein the identifier identifies the second user in the social networking service;
   receiving, by the first computing device, user input of one or more selected social subnetworks in which to include the second user, the one or more selected social subnetworks being from amongst the plurality of social subnetworks of the first user, wherein the one or more social subnetworks each respectively comprise a collection of users in the social networking service; and sending, to a remote computing device of the social networking service, a request to associate the second user with the one or more selected social subnetworks of the first user.

2. The method of claim 1, further comprising:
sending, to the second computing device of the second user, by the first computing device or a remote computing device of the social networking service, identification information of the first user.

3. The method of claim 2, wherein the first computing device sends the identification information of the first user directly to the second computing device using the at least one short-range wireless communication channel.

4. The method of claim 2, wherein the first computing device sends the identification information of the first user to the second computing device by sending a request to a remote computing device of the social networking service to send the identification information of the first user to the second computing device or the second user.

5. The method of claim 2, wherein the first computing device is configured to control at least one of a type or content of identification information that is sent by the first computing device as a function of the geoposition of the first computing device.

6. The method of claim 2, wherein the first computing device is configured to control at least one of a type or content of identification information that is sent by the first computing device as a function of the local time of the first computing device.

7. The method of claim 2, wherein the first computing device is configured to control at least one of a type or content of identification information that is sent by the first computing device to the second computing device or the second user as a function of social networking information about the second user.

8. The method of claim 1, wherein determining the identifier based on the identification data received from the second computing device comprises:
sending, by the first computing device, a request comprising at least a portion of the identification data of the second user to query a datastore on a remote computing device that comprises unique identifiers associated with users in a social networking service; and
in response to sending the request, receiving, by the first computing device, a unique identifier that identifies the second user in the social networking service.

9. The method of claim 1, wherein the identification data received from the second computing device comprises a unique identifier that identifies the second user in the social networking service, and the first computing devices receives social network data about the second user by sending the unique identifier a remote computing device of the social networking service.

10. The method of claim 1, wherein the identifier of the second user comprises a unique identifier that identifies the second user in the social networking service.

11. The method of claim 1, further comprising:
displaying, by the first computing device, an interface that indicates a plurality of social subnetworks of the first user and that accepts the user inputs of one or more selected social subnetworks in which to include the second user.

12. The method of claim 11, wherein the displaying is triggered by receiving identification data of the second user.

13. The method of claim 11, wherein the displaying is triggered by a user request.

14. The method of claim 1, further comprising:
generating for display, by the first computing device, at least one of a visual representation of the second user and a rendering of profile information associated with the second user, wherein the profile information comprises one or more attributes associated with the second user.

15. The method of claim 1, further comprising:
receiving by the first computing device input from the first user comprising a communication and a selection of at least one social subnetwork as recipient of the communication, and
sending, to the remote computing device of the social networking service, the communication and the selection of at least one social subnetwork as recipient of the communication, such that the social networking service permits access to the communication only to members of the at least one social subnetwork selected as recipient.

16. The method of claim 1, further comprising:
determining, by the first computing device, whether the second user is in a subnetwork of at least one other user who is a member of a social network of the first user.

17. The method of claim 1, further comprising:
determining, by the first computing device, whether an indication associated with the second user is included in an access control list; and
when the indication associated with the second user is included in an access control list, sending, by the first computing device, identification data associated with the first user to the second user.

18. The method of claim 1, wherein receiving the identification data of the second user comprises receiving a vCard, meCard, XML, or hCard.

19. The method of claim 1, wherein the identification data of the second user comprises data providing one or more of a first name, last name, phone number, address, and an email address of the second user.

20. The method of claim 1, further comprising:
wherein receiving, by the first computing device, user input of one or more selected social subnetworks in which to include the second user, comprises:
receiving a user input to generate an additional social subnetwork, and
sending, by the first computing device, a request to the remote computing device to generate the additional social subnetwork.

21. The method of claim 1, further comprising:
determining, by the first computing device, contextual information usable to generate a social subnetwork identifier that identifies the social subnetwork; and
associating, by the first computing device, the social subnetwork identifier with the social subnetwork based at least in part on the contextual information.

22. The method of claim 1, further comprising:
receiving, by the first computing device, identification information from a plurality of computing devices in addition to the second computing device; and
identifying, by the first computing device, the plurality of computing devices associated with a plurality of users, wherein the first user and the plurality of users are each associated with the social networking service.

23. A computer-readable storage medium encoded with instructions that, when executed, cause one or more processors of a first computing device to perform operations comprising:

identifying, by a first computing device of a first user and using at least one short-range wireless communication channel, a second computing device of a second user, wherein the first user and the second user are each associated with a social networking service, wherein a social network associated with the first user comprises a plurality of social subnetworks, and wherein the second computing device is in proximity to the first computing device within a range of the at least one short-range wireless communication channel;

receiving, by the first computing device and from the second computing device using the at least one short-range wireless communication channel, identification data of the second user;

determining, by the first computing device, an identifier of the second user based at least in part on the identification data received from the second computing device, wherein the identifier identifies the second user in the social networking service;

receiving, by the first computing device, user input of one or more selected social subnetworks in which to include the second user, the one or more selected social subnetworks being from amongst the plurality of social subnetworks of the first user, wherein the one or more social subnetworks each respectively comprise a collection of users in the social networking service; and sending, to a remote computing device of the social networking service, a request to associate the second user with the one or more selected social subnetworks of the first user.

24. The computer-readable storage medium of claim 23 further encoded with instructions that, when executed, cause one or more processors of a first computing device to perform operations comprising:

sending, by the first computing device, at least one of a type or content of identification information that is sent by the first computing device as a function of the geoposition of the first computing device.

25. The computer-readable storage medium of claim 23 further encoded with instructions that, when executed, cause one or more processors of a first computing device to perform operations comprising:

sending, by the first computing device, at least one of a type or content of identification information that is sent by the first computing device as a function of a local time of the first computing device.

26. The computer-readable storage medium of claim 23 further encoded with instructions that, when executed, cause one or more processors of a first computing device to perform operations comprising:

sending, by the first computing device, at least one of a type or content of identification information that is sent by the first computing device to the second computing device as a function of social networking information about the second user.

27. A mobile computing device, comprising:

one or more processors;

a short-range communication device configured to:

identify a plurality of computing devices, wherein a first user is associated with the mobile computing device and plurality of other users are associated with the plurality of computing devices, wherein the first user and the plurality of other users are each associated with a social networking service, wherein a social network associated with the first user comprises a plurality of social subnetworks, wherein the plurality of social subnetworks each respectively comprise a collection of users in the social networking service, and wherein the plurality of computing devices are in proximity to the mobile computing device within a range of at least one short-range wireless communication channel, and receive, from the plurality of computing devices using at least the one short-range wireless communication channel, identification data of the plurality of other users; and a social networking module executable by the one or more processors to:

determine identifiers of each of the plurality of other users based at least in part on the identification data received from the plurality of computing devices, wherein the identifiers identify the plurality of users in the social networking service, and send, to a remote computing device that provides the social networking service, a request to associate the plurality of users with a social subnetwork of the first user using the social networking service.

\* \* \* \* \*